(12) United States Patent
Chaikin et al.

(10) Patent No.: US 10,654,019 B1
(45) Date of Patent: May 19, 2020

(54) CAPACITIVE CONTROL OF COLLOIDAL SELF-ASSEMBLY

(71) Applicant: NEW YORK UNIVERSITY, New York, NY (US)

(72) Inventors: Paul M. Chaikin, New York, NY (US); Rodrigo Guerra, New York, NY (US)

(73) Assignee: NEW YORK UNIVERSITY, New York, NY (US)

( * ) Notice: Subject to any disclaimer, the term of this patent is extended or adjusted under 35 U.S.C. 154(b) by 0 days.

(21) Appl. No.: 15/921,451

(22) Filed: Mar. 14, 2018

Related U.S. Application Data

(60) Provisional application No. 62/471,899, filed on Mar. 15, 2017.

(51) Int. Cl.
  *B01J 13/00* (2006.01)
  *B01J 19/08* (2006.01)
(52) U.S. Cl.
  CPC ......... *B01J 13/0039* (2013.01); *B01J 19/088* (2013.01); *B01J 2219/0807* (2013.01); *B01J 2219/089* (2013.01)
(58) Field of Classification Search
  CPC .................. B01J 13/0039; B01J 19/088; B01J 2219/089; B01J 2219/0807
  See application file for complete search history.

(56) References Cited

U.S. PATENT DOCUMENTS

| | | | |
|---|---|---|---|
| 2006/0235086 A1 | 10/2006 | Maskaly et al. | |
| 2019/0153237 A1* | 5/2019 | Boo | A61B 5/1473 |

OTHER PUBLICATIONS

Ameloot, R., et al., "Patterned film growth of metal—organic frameworks based on galvanic displacement," Chem. Commun., 2010, 46(21):3735-3737.
Axelos, M.A.V., et al., "Phase Diagrams of Aqueous Solutions of Polycarboxylates in the Presence of Divalent Cations," Macromolecules, 1994, 27(22):6594-6602.
Bohn, J.J., et al., "Charge stabilized crystalline colloidal arrays as templates for fabrication of non-close-packed inverted photonic crystals," Journal of Colloid and Interface Science, 2010, 344(2):298-307.
Chen, L., et al., "Noncovalently Netted, Photoconductive Sheets with Extremely High Carrier Mobility and Conduction Anisotropy from Triphenylene-Fused Metal Trigon Conjugates," J. Am. Chem. Soc., 2009, 131(21):7287-7292.
Davis, R.L., et al., "Progression of Alignment in Thin Films of Cylinder-Forming Block Copolymers upon Shearing," Macromolecules, 2015, 48(15):5339-5347.
Feng, L., et al., "DNA Patchy Particles," Advanced Materials, 2013, 25(20):2779-2783.
Finger, J., et al., "High power ultra-short pulse laser ablation of IN718 using high repetition rates," Journal of Materials Processing Technology, 2015, 226:221-227.

(Continued)

*Primary Examiner* — Arun S Phasge

(74) *Attorney, Agent, or Firm* — Foley & Lardner LLP

(57) ABSTRACT

A system for controlling the ion content of a colloidal system. A porous deionizer is used to selectively remove and isolate ions from a colloidal system. The colloidal particles within the system have their attraction/repulsion tuned by control of the ion content to alter the interaction between the colloidal particles.

8 Claims, 5 Drawing Sheets

(56) References Cited

OTHER PUBLICATIONS

Gu, W., et al., "Review of nanostructured carbon materials for electrochemical capacitor applications: advantages and limitations of activated carbon, carbide-derived carbon, zeolite-templated carbon, carbon aerogels, carbon nanotubes, onion-like carbon, and graphene," WIREs Energy Environ, 2014, 3(5):424-473.

Ikegami, A., et al., "Precipitation of Polyelectrolytes by Salts," Journal of Polymer Science, 1962, 56(163):133-152.

Irvine, W.T.M., et al., "Dislocation reactions, grain boundaries, and irreversibility in two-dimensional lattices using topological tweezers," PNAS, Sep. 24, 2013, 110(39):15544-15548.

Irvine, W.T.M., et al., "Fractionalization of Interstitials in Curved Colloidal Crystals," Nature Materials, 2012, 11:948-951.

Issadore, D., et al., "High Voltage Dielectrophoretic and Magnetophoretic Hybrid Integrated Circuit/Microfluidic Chip," J Microelectromech Syst, Dec. 18, 2009 (6):1220-1225.

Ji, H., et al., "Direct in Situ Conversion of Metals into Metal—Organic Frameworks: A Strategy for the Rapid Growth of MOF Films on Metal Substrates," ACS Appl. Mater. Interfaces, 2016, 8(47):32414- 32420.

Jin, Y., et al., "Patterning of Aluminium thin film on polyethylene terephthalate by multi-beam picosecond laser," Optics and Lasers in Engineering, 2015, 74:67-74.

Kelleher, C.P., et al., "Charged hydrophobic colloids at an oil—aqueous phase interface," Physical Review E, 2015, 92:062306, 9 pages.

Kelleher, C.P., et al., "Phase behavior of charged colloids at a fluid interface," Physical Review E, 2017, 95:022602, 9 pages.

Kodger, T.E., et al., "Precise colloids with tunable interactions for confocal microscopy," Scientific Reports, 2015, 5:14635, 10 pages.

Man, W., et al., "Isotropic band gaps and freeform waveguides observed in hyperuniform disordered photonic solids," PNAS, Oct. 1, 2013, 110(40):15886-15891.

Man, W., et al., "Photonic band gap in isotropic hyperuniform disordered solids with low dielectric contrast," Optics Express, Aug. 26, 2013, 21(17):19972-19981.

Matsumoto, E.A., et al., "Wrinkles and splay conspire to give positive disclinations negative curvature," PNAS, Oct. 13, 2015, 112(41):12639-12644.

Meyappan, M., et al., "Carbon nanotube growth by PECVD: a review," Plasma Sources Sci. Technol., 2003, 12(2):205-216.

Meyyappan, M., "A review of plasma enhanced chemical vapour deposition of carbon nanotubes," J. Phys. D: Appl. Phys., 2009, 42(21):213001, 15 pages.

Michaeli, I., "Ion Binding and the Formation of Insoluble Polymethacrylic Salts," Journal of Polymer Science, 1960, 48(150):291-299.

Michaeli, I., et al., "Phase Separation of Polyelectrolyte Solutions," Journal of Polymer Science, 1957, 23(103):443-450.

Overbeek, J.T.G., et al., "Phase Separation in Polyelectrolyte Solutions. Theory of Complex Coacervation," Journal of Cellular and Comparative Physiology, 1957, 49(S1):7-26.

Palacci, J., et al., "Photoactivated Colloidal Dockers for Cargo Transportation," J. Am. Chem. Soc., 2013, 135(43):15978-15981.

Royer, J.R., et al., "Precisely cyclic sand: Self-organization of periodically sheared frictional grains," PNAS, Jan. 6, 2015, 112(1):49-53.

Russell, E.R., et al., "Colloidal gelation of oppositely charged particles," Soft Matter, 2012, 8(33):8697-8703.

Sheberla, D., et al., "Conductive MOF electrodes for stable supercapacitors with high areal capacitance," Nature Materials, 2017, 16:220-224.

Sheberla, D., et al., "High Electrical Conductivity in $Ni_3(2,3,6,7,10,11$-hexaiminotriphenylene$)_2$, a Semiconducting Metal—Organic Graphene Analogue," J. Am. Chem. Soc., 2014, 136(25):8859-8862.

Spruijt, E., et al., "Dynamic Force Spectroscopy of Oppositely Charged Polyelectrolyte Brushes," Macromolecules, 2010, 43(3):1543-1550.

Spruijt, E., et al., "Reversible assembly of oppositely charged hairy colloids in water," Soft Matter, 2011, 7(18):8281-8290.

Tender, L.M., et al., "Electrochemical Patterning of Self-Assembled Monolayers onto Microscopic Arrays of Gold Electrodes Fabricated by Laser Ablation," Langmuir, 1996, 12(23):5515-5518.

Vaidya, R., et al., "Computer-Controlled Laser Ablation: A Convenient and Versatile Tool for Micropatterning Biofunctional Synthetic Surfaces for Applications in Biosensing and Tissue Engineering," Biotechnol. Prog., 1998, 14(3):371-377.

Vega, D.A., et al., "Coupling between mean curvature and textures in block copolymer thin films deposited on curved substrates," Soft Matter, Oct. 2013, 9(39):9385-9391.

Wall, F.T., et al., "Gelation of Polyacrylic Acid by Divalent Cations," Journal of Polymer Science, 1951, 7(1): 86-88.

* cited by examiner

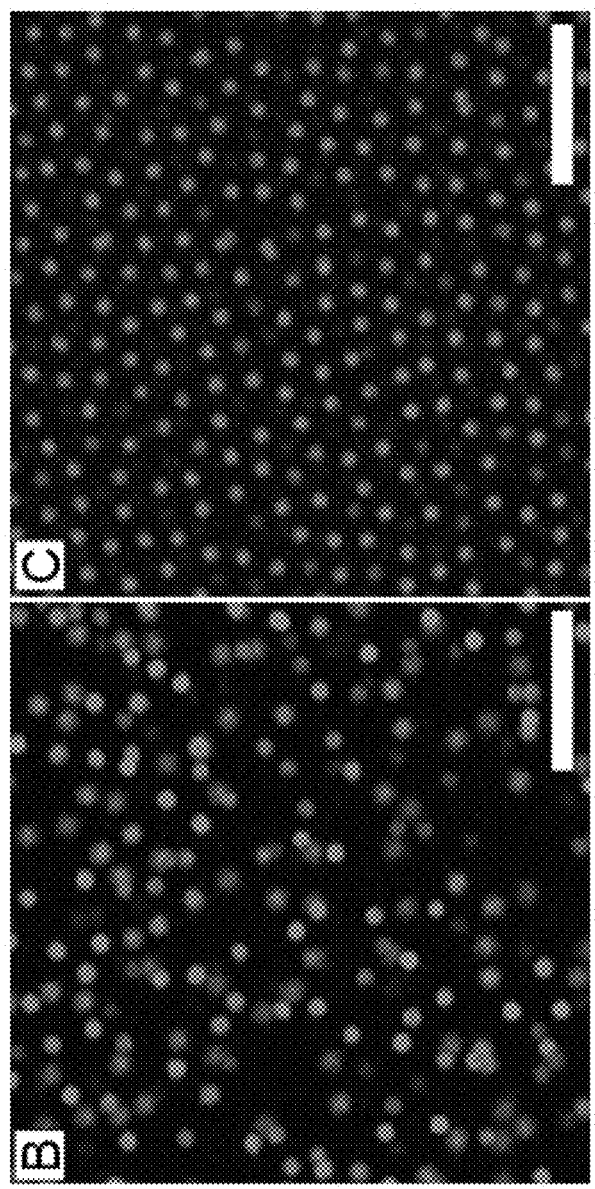
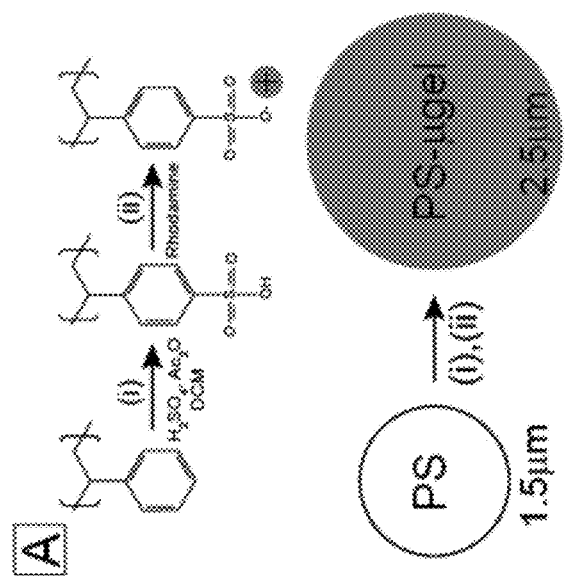
Figure 1A
Figure 1B
Figure 1C

CAPACITIVE CONTROL OF COLLOIDAL SELF-ASSEMBLY

CROSS-REFERENCE TO RELATED APPLICATION

This application claims priority to and benefit of U.S. Provisional Patent Application No. 62/471,899 filed Mar. 15, 2017, the entire disclosure of which is incorporated herein by reference.

TECHNICAL FIELD

The present disclosure relates generally to methods for control of self-assembled structures.

BACKGROUND

Electrostatic stabilization of colloidal particles is one of the oldest and most common tools to produce stable colloidal suspensions. Yet, despite this ubiquity, attempts to control the phase behavior of colloids by controlling their electrostatic properties have been limited to somewhat coarse techniques: such as dialysis, slow hydrolysis of acid/base precursors, or the absorption of reactive vapors.

Control over the repulsion between the surfaces of like-charged colloidal particles is essential to food technology, pharmaceutical products, paints, mineral refinement, construction materials, etc. This repulsion is idiomatically referred to as electrostatic stabilization, but this shorthand is a misnomer for a force that is essentially due to the entropy of the dissociated counter-ions. As such, this force is modulated both by controlling the dissociation of ionizable moieties of the particles, and by controlling the concentration of free ions in solution. However, the ability to control salt concentration remains a rather blunt instrument.

For example, the state-of-the-art method to produce charged colloidal crystal arrays (CCAs) still appears to be passive, bulk dialysis of the colloid against deionized water, followed by equilibration of the fluid with ion exchange resins. Equilibration of small colloid volumes by diffusion can occur relatively quickly, but equilibration times increase with increasing volume, and the fragility of these crystals precludes adequate mixing. When the structure of the colloidal suspension is not important, electrodialysis presents a far more effective means of deionization; however, the parallel arrangement of diluate and concentrate channels causes persistent electrokinetic currents of the colloidal particles, and the operation of the device depends on the constant production of $H_2$ and $O_2$ gas by electrolysis of water at the electrode surfaces to sustain the currents that drive charge separation.

Microfluidic technology now also offers updated versions of microdialysis tools, whereby co-flow, cross-flow, and hybrid flow (dead-end sample chamber separated from a flushing stream) devices allow for the rapid mixing and equilibration of colloids, together with good control over the compositions of the fluids that are mixed or flushed. Yet, these devices are still limited to small volumes, and integration of fine spatial control over fluid composition would require sophisticated fabrication techniques and the simultaneous control of tens or hundreds of fluid pumps.

There remains a need for method and systems for controlling the salinity of solutions and the surface charging of colloids.

SUMMARY

Embodiments described herein relate generally to methods for manipulating colloidal particles comprising a porous deionizer with one or more porous electrodes.

Some embodiments relate to fabricating a porous deionizer.

Some embodiments relate to a method of manipulating salt content in a colloidal system.

Some embodiments relate to the production of large-scale colloidal crystals using a combination of porous deionizer and epitaxial template.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

FIG. 1A) Schematic synthesis of fluorescent polyelectrolyte microgels by sulfonation of polystyrene microparticles and fluorescent ion exchange. FIG. 1B) Confocal micrograph of microgels dispersed in purified DMI in prototype device. FIG. 1C) Identical particles in identical suspension, after 200 mV potential is applied across electrodes. Scale bars: 25 µm.

Figure 2:
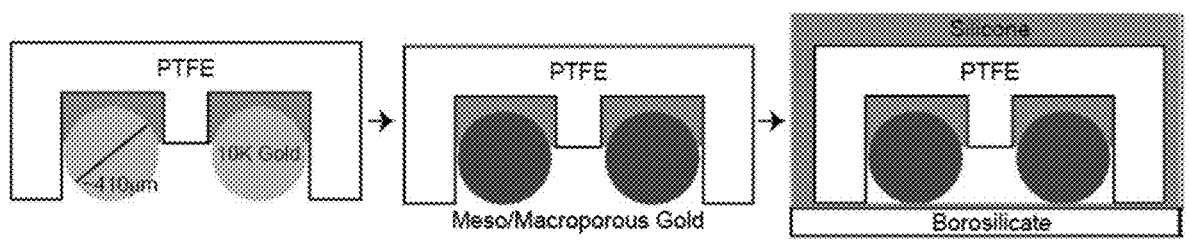
FIG. 2. Schematic construction of our prototype colloid deionizing device. Low karat gold wires are threaded through PTFE device and held in place with silicone. Wires are dealloyed by immersion in nitric acid, leaving behind bicontinuous and mesoporous electrodes. Encapsulation in platinum-cure silicone prevents sample contamination.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to systems and methods to control the local and global self-assembly and crystallization of colloidal particles by manipulating the local salt concentration of the suspending fluid. Certain embodiments relate to a deionizer for use with colloidal systems. Further, colloidal crystal arrays may be manufactured according to methods herein. In particular, methods described herein provide the ability to manufacture large sheets of single, oriented crystals. Broadband photonic materials may also be possible.

Electrostatic stabilization and manipulation of colloidal particles is a desirable tool. However, the control of ion concentrations is impeded by the difficulty of adding or removing ions from what are ostensibly closed systems; moreover, the salt gradients that inevitably arise when manipulating salt concentrations lead to a vast array of electrokinetic phenomena and convective instabilities.

These problems can be mitigated or solved by immersing porous electrodes in the colloidal suspension, provided that the size of the electrode pores is smaller than the size of the smallest colloidal particle, but larger than the size of the electrolyte molecules. This restriction on the pore size of the electrode guarantees that its surface will behave as a semi-permeable membrane, allowing the free diffusion of ions into the bulk of the electrode, but precluding the transport of colloidal particles. In this way, the surface area and porosity of the electrode makes it possible to quickly and reversibly sequester dissolved ions in the interior of the electrode by applying an electrical potential difference between two separate electrodes: thus operating like a capacitive deionization (CDI) device.

Embodiments described herein demonstrate the effectiveness and versatility of this technique by solving two particularly vexing problems: the rigorous deionization of solutions with dispersed particles, and the controlled assembly of oppositely-charged particles facilitated by the precise modulation of local salinity. The first problem is related to the entropy of ions, as mixing entropy makes it easy to dissolve things in a fluid, but difficult to pull them out. A proper control system should be able to do both.

As introduced above, the first problem is related to the entropy of ions. In particular, it is quite difficult to produce aqueous colloidal dispersions with particles that repel each other over distances greater than a few tens of nanometers, and impossible to do so for distances beyond a micrometer. In fact, this particular problem presents two different hurdles. The first hurdle relates to our ability to maintain the purity of a solvent in the face of ionogenic contaminants that may be absorbed from the air or dissociate from the glass containers that hold it; the second from the spontaneous generation of charges through the autoprotolysis of water molecules, whereby $2H_2O \leftrightarrow H_3O^+ + HO^-$.

It is possible to overcome both of these obstacles by using solvents with dielectric constants that are too low to dissolve ordinary salts. Compounds such as alkali halides, sulfates, or carboxylates dissociate poorly, if at all, in solvents with dielectric constants less than approximately 10 unless specific ligands or additives are included, and thus cannot act as ionic contaminants. However, because their dielectric constants are too low to allow ordinary ionic dissociation, the charging of particle surfaces and the dissociation of ions in the bulk relies on poorly controlled and often unidentified impurities, which makes predicting and controlling the charging of the particle surfaces and the fluid is challenging. When the dielectric constant of the fluid drops below approximately 3, even this kind of impurity-driven charging is precluded, which makes electrostatic stabilization impossible without the addition of specific additives which act as charging agents.

One embodiment instead solves this problem through the use of a system of charged particles dispersed in a solvent capable of dissolving common salts, but which does not itself dissociate, and which are deionized by a pair of immersed porous electrodes. The solvent may be a polar aprotic solvent. The solvent is preferably a non-aqueous electrochemical solvent. Solvents that satisfy these criteria include, but are not limited to: acetonitrile, acetone, dimethysulfoxide, propylene and ethylene carbonates, sulfolane, 1,3-dimethyl-2-imidazolidinone, tetramethylurea, and dimethylformamide. In one specific application a colloidal system with photonic applications utilizes 100-200 nm particles and is brought to a salinity of about 0.1 micromolar. Some embodiments relate to a device for deionizing such a system.

To demonstrate this capacity we fabricated microgels of poly(styrenesulfonic acid) by sulfonating cross-linked polystyrene latex particles in a solution of sulfuric acid and acetic anhydride (FIG. 1A). The ions that dissociate from the acid moieties generate an osmotic pressure that swells the polymer network and their leakage into the surrounding fluid gives them a large and stable surface potential. Many of those counterions may be exchanged with positively-charged, fluorescent molecules (Rhodamine 700), to render them visible in a confocal microscope. These particles readily disperse in 1,3-dimethyl-2-imidazolidinone (DMI), a remarkably stable and inert solvent with a dielectric constant, ϵ~38. Despite extensive purification attempts, we were not able to produce a suspension of particles with a range of repulsion larger than a few hundred nanometers (FIG. 1B): corresponding to micromolar concentrations of residual ions. Nevertheless, when a few microliters of this dispersion were loaded into a parallel wire deionizer, it was possible to reduce the excess salt concentration by at least 2 orders of magnitude by applying a 200 mV potential difference between two porous electrodes immersed in the solution (FIG. 1C).

One embodiment of a deionizer was constructed by threading two 10 karat yellow gold wires (41 wt % Au, 6-12 wt % Ag, 40-50 wt % Cu, 3-6 wt % Zn, 26 gauge, Hauser and Miller) into a laser engraved poly(tetrafluoro ethylene) (PTFE) holder, filling gaps with silicone elastomer (Sylgard 184, Dow Corning), and immersing into a dealloying solution. The dealloying—carried out chemically using 75 wt % nitric acid or electrolytically using a 1M solution of methane sulfonic acid as a supporting electrolyte—removes the less noble elements of the gold alloy and leaves behind a porous and bicontinuous scaffold that has a large surface area and is electrically conductive. The device is then sealed by pressing it into a borosilicate coverslip (Grainger) coated with a thin film of cured silicone (NuSil, LS-6946), and encapsulating it in more silicone (NuSil, LS-6946), as shown in FIG. 2. This design isolates the fluid from any surfaces that may contain ionic contaminants. The porous electrodes, in one embodiment, have a pore volume comparable to the accessible fluid volume, and were easily capable of absorbing the extra ions present in solution: evident in the long-range (several micrometer) repulsion between particles. The amount of electrode material required to obtain a specific reduction in salinity will depend on, among other things, its specific surface area, the maximum voltage supported by the solvent (its electrochemical window), and the double layer capacitance of the ion/surface/solvent combination. It should be appreciated that such an example is nonlimiting and that in alternative embodiments, the particles and spacings may be selected so as to exhibit desired optical properties, such as for light scattering or confocal microscopy. Further, in additional embodiments, dispersions of commercially available nanoparticle pigments—such as titanium dioxide, zinc sulfate, and barium titanate—may be used and exhibit photonic properties.

Figures 3A, 3B, 3C:
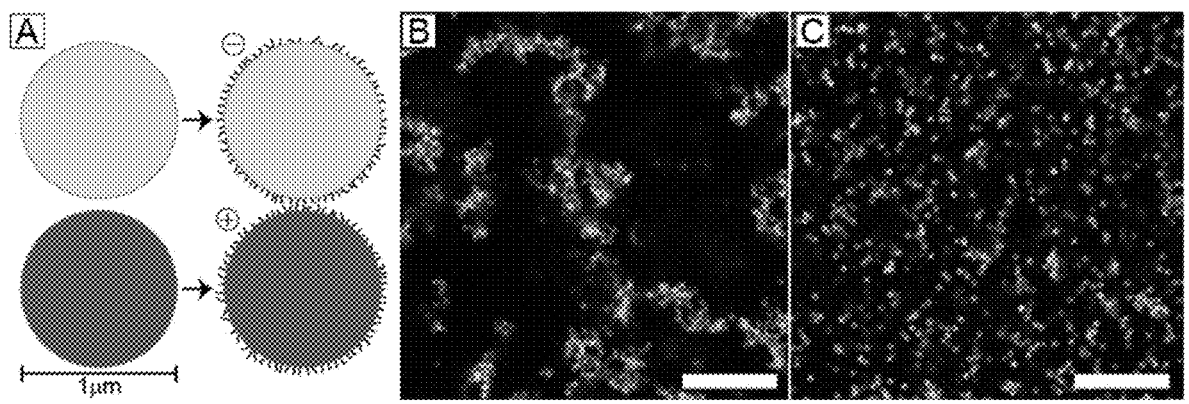
FIG. 3A) Fluorescent microparticles are functionalized with oppositely charged polyelectrolyte brushes by surface initiated ATRP.
FIG. 3B) Confocal micrograph of 5 vol % particles in 125 mM solution of LiCl in refractive-index and buoyancy matching mixture of formamide and sulfolane.
FIG. 3C) Identical particles suspended in a 130 mM LiCl solution in same formamide-sulfolane mixture. Residual attraction vanishes for LiCl concentrations above ~140 mM. Scale bars: 15 µm.

As mentioned above, a second challenge to provide a viable method and system for electrostatic stabilization is addressing the controlled assembly of oppositely-charged particles. Ordinarily, the same large, entropic forces that keep like-charged particles apart drive oppositely charged particles together—leading to irreversible flocculation. A colloidal model-system of fluorescent particles that are refractive-index and buoyancy matched to a high dielectric (ϵ~80) fluid was developed. Then, atom transfer radical polymerization (ATRP) was used to grow polyelectrolytes off the particle surfaces to precisely control their net surface-charge density (FIG. 3A). In one embodiment, the deionizer is utilized with a colloidal system, rather than matching to a high dielectric fluid, tunable steric interactions are used. For example, oppositely charged particles that are covered with a fairly thick (few nanometers at least) neutral polymer brush that do not interact with each other when the screening length of the solution is much shorter than the thickness of this brush, but start to attract and assemble once the deionizer makes the screening length long enough.

Unsurprisingly, when the salt concentration of the solvent is low, mixtures of otherwise identical batches of oppositely charged particles flocculate and form rigid gels; however, we find that these flocs dissolve and oppositely charged pairs of particles act as impenetrable hard spheres when the salt concentration of the solution exceeds a critical value, c*(FIG. 3B-3C): in agreement with our understanding of polyelectrolyte coacervates. Nevertheless, while the strength of the pair-wise attraction between such pairs grows smoothly, it increases rapidly as the salt concentration falls below c*, which makes finding the precise salt concentration that leads to crystallization, rather than uncontrolled aggregation, tedious and time consuming. Thus, while the reliance on control of salt concentration with respect to the c* value has been known, it fails to provide for the necessary control to yield a useful mechanism to grow structures. Indeed, experiments that have used variations of this polyelectrolyte-coacervate-mediated attraction between particles have shown that the interaction is reversible and controllable, but have never succeeded in forming well-ordered structures.

Figures 4A, 4B, 4C:
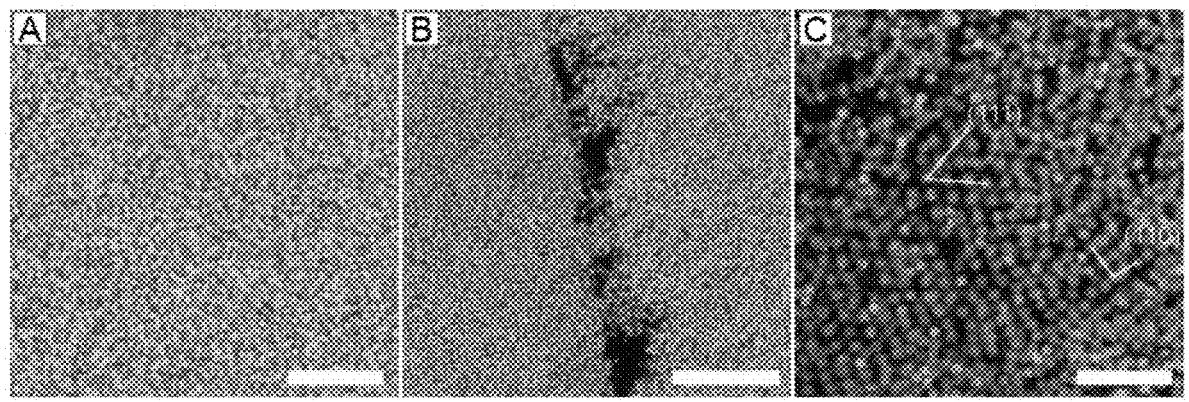
FIG. 4A) Dense suspension of oppositely-charged particles in 133 mM LiCl solution in prototype device. Dilute suspensions prepared at this salinity show residual attraction between +/− particle pairs, but dense suspensions show no obvious order.
FIG. 4B) Same dispersion equilibrated with electrode potential held at 250 mV. Reduction in salinity causes particles to aggregate and form a stiff, brittle gel.
FIG. 4C) Same dispersion yet again, this time equilibrated at an electrode potential of 25 mV. The subtle increase in the attraction between +/− pairs permits spontaneous bond-breaking and crystallization. However, electrokinetic flows shear them off the surface. Scale bars represent: 15 µm, 40 µm, and 8 µm respectively.

However, certain embodiments of the invention utilize a different process to overcome the issue of oppositely charged particles. Starting from a liquid dispersion (FIG. 4A), the deionizer is easily capable of drawing out enough salt from the solution to transform the colloid into a rigid gel (FIG. 4B). However, it is also possible to quench the dispersion slowly enough that it may be able to form crystals. The desired quench rate will depend on the particle size and concentration, and can be controlled easily and precisely with a galvanostat or charge amplifier. The potential required to achieve this for a binary mixture will depend on the volume of the suspension and the volume and capacitance of the electrodes. It should be appreciated that the range of electrode volume to suspension volume depends on the specific capacitance of the electrode, the magnitude of the desired salt concentration difference, and the maximum admissible applied voltage.

Given that this binary mixture is composed of particles with nearly identical diameters, we expect an equimolar suspension to assemble in a CsCl lattice, which is equivalent to a BCC lattice where the central atom and vertex atoms belong to different particle species. Consequently, (111) crystal planes will cut through alternating triangular lattices of positive and negative particles, but the lattice constant for these triangular arrangements will be $$2\sqrt{\frac{2}{3}}d \approx 1.6d,$$

where d is the particle diameter. Similarly, the (100) direction will be composed of alternating layers of positive and negative particles arranged in a square lattice with lattice constant $2/\sqrt{3}d \approx 1.15d$. Finally, (110) lattice planes will also alternate between positive and negative particles, and will have a rectangular unit cell with side lengths equal the that of the (111) and (100) lattice constants. Different stoichiometries and size ratios crystalize into other structures.

The parallel plate geometry of the prototype device creates electrophoretic flows in the gap, and causes diffusiophoretic flows in the material that is outside. Currents and flows that shear and yield the solid persist for many hours. Nevertheless, certain regions of the device are less affected by these fluxes, and we find clear evidence of crystals that nucleated from the coverslip surface. In particular, we find that the positively charged particles preferentially stick to the coverslip surface, and find large areas of the sample where the particles stuck to the coverslip reflect the order expected from the crystal planes of the CsCl lattice (FIG. 4C).

Figure 5A:
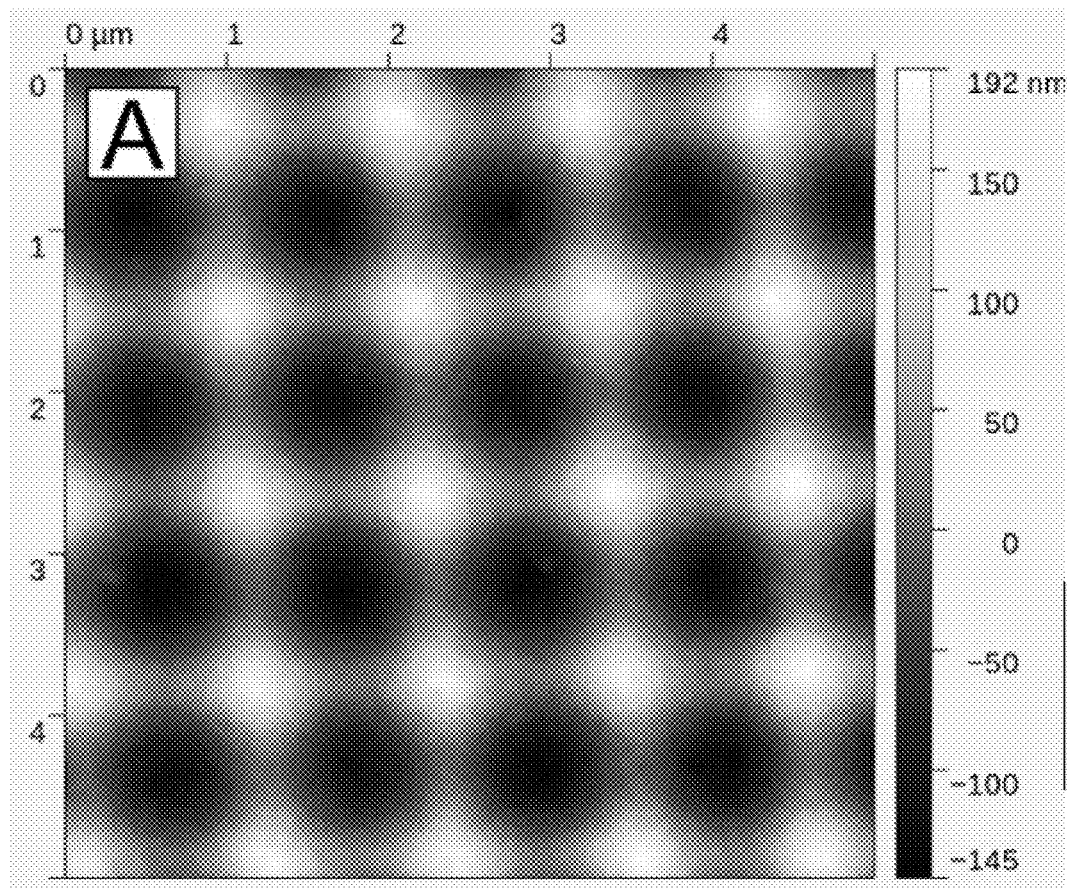
FIG. 5A) Atomic force microscope (AFM) image of interferometrically pattered nickel stamp used to mold (100) epitaxial stamps.
Figure 5B:
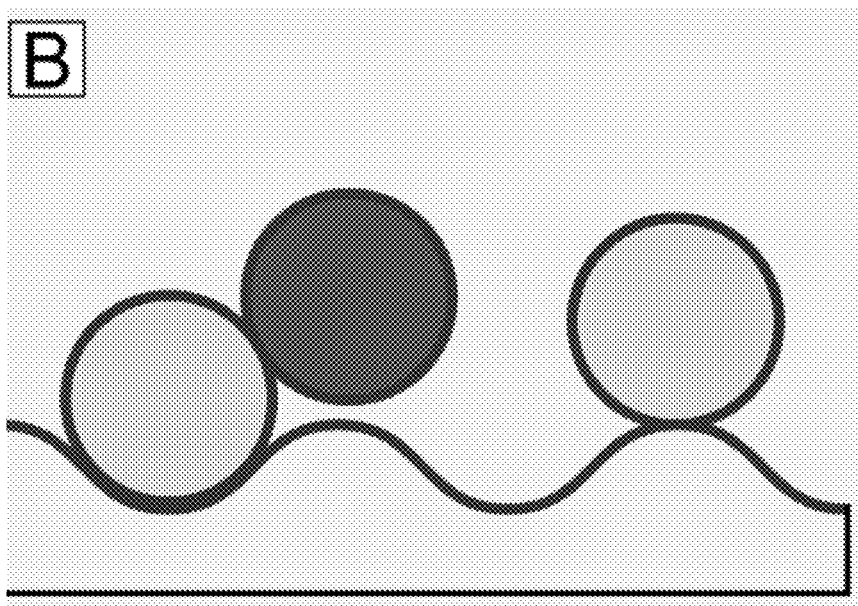
FIG. 5B) Particles that have a short-range attraction to the surface will tend to bind to the concave pockets of the template, as the larger contact area increases the adsorption energies compared to flat or convex regions.
Figure 5C:
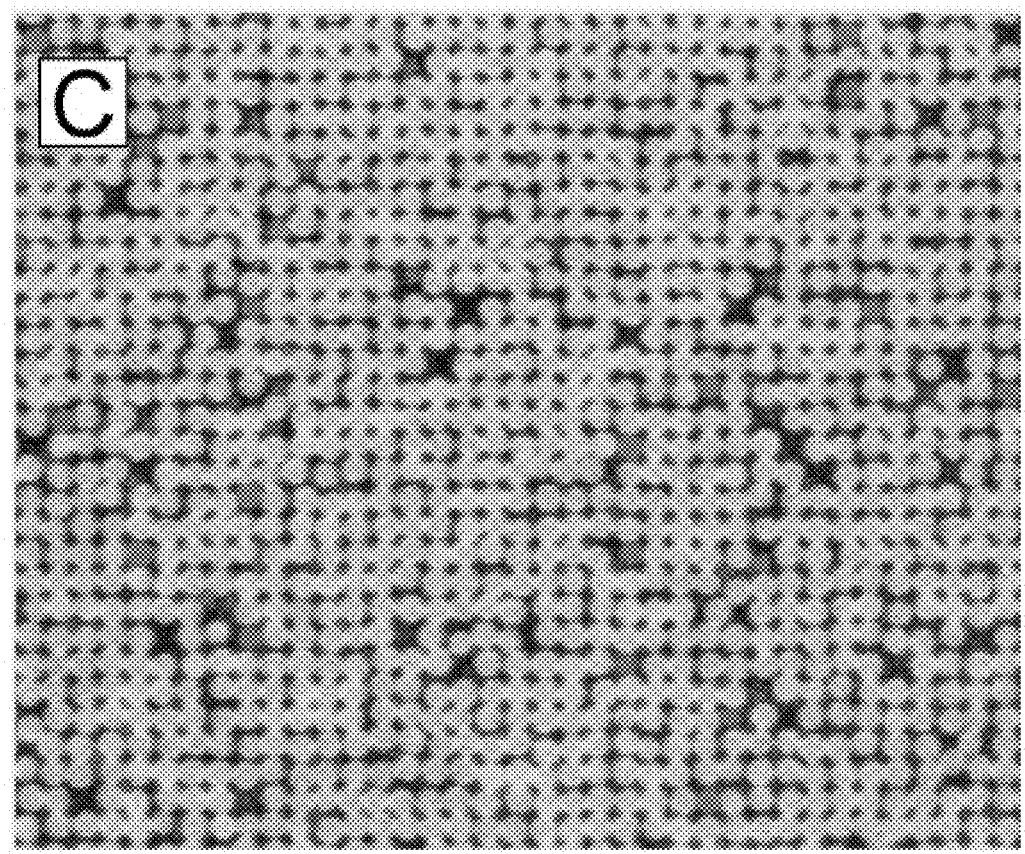
FIG. 5C) Confocal micrograph of nearly perfect crystal grown from the epitaxial template surface.

In one embodiment, the seemingly random surface nucleation and orientation of crystalline structures generated by the slow quench process is avoided by using a holographically patterned template the conforms to the periodicity of the desired lattice. In particular, large scale (many centimeters to a meter long) templates with perfect square and hexagonal symmetries and lattice parameters as small as a few hundred nanometers can be manufactured using grayscale interference lithography, and purchased commercially. An atomic force micrograph of one such square-symmetric template is shown in FIG. 5A. When the surface is modified to provide a short-range attractive force between the template and either the positive or negative particles, the targeted particles will adsorb in the concave pockets of the template and reproduce the long-range order that was imprinted lithographically. The long-range order induced by this specific attraction is capable of avoiding the stochastic crystal nucleation process that produced the randomly oriented crystal grains and thus leads to perfectly oriented, macroscopic crystals (FIG. 5B-5C).

While the example device exhibits some undesired characteristics, additional embodiments having an interdigitated electrode design should be less susceptible to electrokinetic flows. Consequently, in one embodiment a deionizer allows for the growth of crystals over large areas using a pairwise particle interaction that relies on inexpensive and scalable polyelectrolyte synthesis and a particle-particle adhesion mechanism that is well-characterized and applicable to aqueous and non-aqueous solvents alike.

While certain examples herein include the use of specific polymers and/or solvents, such have been chosen for ease of study for experimental purposes, which makes it possible to study the assembly of dense particle suspension in real time and in three dimensions by confocal microscopy. However, grafting of charged polymers to solid surfaces using atomic transfer radical polymerization ("ATRP") is a merely an example and well-developed technology that can be applied to a wide variety of colloids: be they polymeric, inorganic, or metallic. Thus, embodiments may utilize an array of polymers and solvents, with the combination of scalable surface polymerization and scalable salinity control enabling the growth of binary—and possibly ternary—crystals that mix-and-match metallic, inorganic, and polymeric particles as functional meta-materials.

Using dealloyed gold electrodes as an illustrative example, we estimate of the volume of electrode material required for an embodiment desired to, for example, remove 1 mmol of salt from a 1 L solution using a potential difference of 500 mV (thus avoiding electrolysis) is as follows. The specific surface area of the electrode is approximately 2*metal volume fraction/pore radius, where the typical volume fraction of metal in the porous electrode is ~0.5, and an optimistic but achievable estimate for the pore radius is 5 nm. Multiplying this specific surface area by the typical specific capacitance of gold surfaces in water (approximately 18 uF/cm^2), gives an electrode capacitance of 36 F/ml. At the desired 500 mV potential difference each electrode will hold 9 C/ml of positive and negative ions respectively (the potential difference between symmetric electrodes and a symmetric electrolyte solution will be half the difference between the two electrodes). Consequently, to remove the approximated 200 coulombs of charge contained in the 1 mmol of salt would require about 24 ml of electrode material, about 2% of the total volume. Embodiments with less ideal materials may require 10% or even 20%.

The solvent should be sufficiently redox stable to avoid breakdown at the working voltage for the system. In one embodiment, the solvent is a polar solvent, including water and alcohols, such as short chain alcohols, and, in particular, polar solvents that can dissolve salts, for example DMF, DMSO, sulfolane, acetonitrile, and ethylene and propylene carbonates.

Polymers may be selected for formation of desired end products. For example, carboxyl-modified-latex to form CML beads, as well as colloidal systems such as reversible addition-fragmentation chain transfer (RAFT), (MADIX), iodine transfer polymerization (ITP), and block copolymer adsorption. Further, nonpolymeric particles may be used in certain embodiments, such as metallic or inorganic nanoparticles.

Further, the deionizer may be used for the control of multivalent ion concentration. Multivalent ions dramatically affect the stability and phase behavior of colloidal particles, polyelectrolytes, and biological macromolecules. Electrolytes composed only of multivalent salts tend to cause irreversible flocculation; however, the addition of divalent salts to polyelectrolyte hydrogels and solutions, in combination with monovalent salts, triggers well-characterized volume-phase transitions and reversible phase separation. Moreover, mixtures of monovalent and divalent salts are an integral part of DNA technologies, and phosphate buffers are common to a wide variety of biological assays.

Electrolytes used with certain embodiments may be hard ions, such as lithium. Further, the electrolytes may be selected to ensure selective passage through the semipermeable membrane, allowing for isolation of the ions. Salts may be used to form the electrolytes.

Because the adsorption energy of a multivalent ion of charge Z at the surface of the oppositely charged electrode is Z times larger than that of an equivalent monovalent ion, the Boltzmann weighted probability of capturing such a multivalent ion in the interior of the porous electrode is exponentially larger than that of capturing an equivalent monovalent ion. This presents the possibility of precisely modulating the concentration of divalent ions in solution without noticeably perturbing its remaining components. Such control over divalent ion concentrations could prove to be a valuable addition to live-cell assays that depend on calcium- or magnesium-mediated signaling, and DNA-programmed self-assembly.

Control over the volume-transition and precipitation of polyelectrolytes effected by divalent salts also offers the ability to replace thermosensitive polymers, such as poly(N-isopropyl acrylamide), with polyelectrolytes. The heat-induced collapse and adhesion of thermosensitive polymers and gels has proven to be a versatile tool to study and direct a myriad colloidal phenomena, but the thermosensitivity of these polymers depends on the peculiar properties of aqueous hydrogen-bonding networks that are unique to water or water-rich solutions. By contrast, while the detailed conditions may vary between solvents, the volume transition and precipitation of polyelectrolytes in high-dielectric solvents mediated by multivalent ions are generic phenomena. Replacing thermal actuation with salt actuation could prove to be a boon to colloidal experiments, as our refractive-index- and buoyancy-matched colloidal particle system could be modified to mimic all the properties of thermosensitive colloids, while also providing the optical transparency required to obtain full 3D structural information by confocal microscopy: something that is impossible in aqueous solutions.

While the desired function of the deionizer has been described above as well as methods for same, there are several embodiments of a deionizer that may be utilized. The above examples utilize a parallel plate electrode design that exhibits some drawbacks that are believed to be overcome in other embodiments. In particular, some embodiments of the deionizer provide bulk quantities (greater than microscopic scale) of material.

One embodiment of a deionizer utilizes interdigitated electrodes. The size of the electrode may be selected based upon fabrication capacity, tolerance for electrokinesis, and desired equilibration time. If the electrodes are all confined to a plane, smaller electrodes reduce the time required for lateral salt gradients to diffuse away and, thus, help reduce the amount of electrophoresis, electroosmosis, and lateral diffusiophoresis. However, if the sample is thicker than a few millimeters then salt gradients can build along the thickness of the device, which could lead to diffusiophoresis and—in extreme cases—salt-fingering or double diffusive convection. However, in one embodiment by changing the salinity of the solution slowly, one can make the device as thick as desired (within understood limits), and the features as big as desired (within understood limits), typically up to a few hundred microns.

Figure 6:
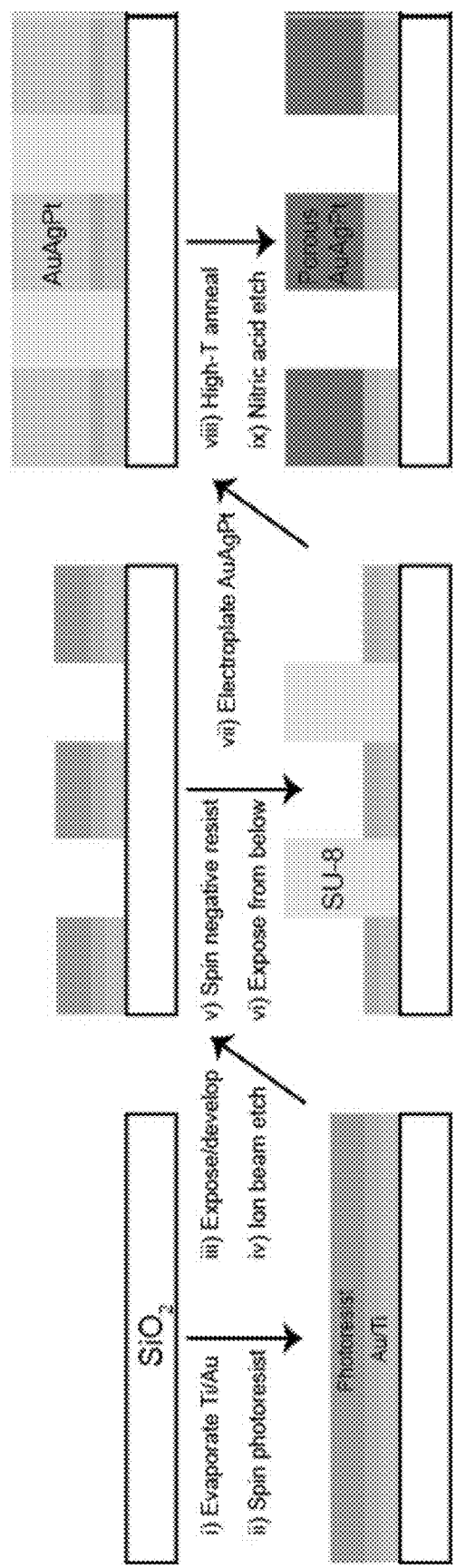
FIG. 6. Electrode fabrication workflow (i-iv) Patterned gold microelectrodes are printed on a fused silica substrate using a conventional sequence of metal evaporation, photolithographic patterning, and ion milling. (v-vii) The electrode pattern serves as a mask for a thick layer of negative photoresist, that in turn serves as a spacer and mold for the pulsed electroplating of a $Au_xAg_{1-x-y}Pt_y$ alloy. (viii-ix) The metal film is annealed in an inert gas furnace, which also removes the cured photoresist. Finally, the alloy film is converted into mesoporous electrodes by immersion in a nitric acid bath.

For example, patterned mesoporous electrodes can be used. Thermal and electron-beam evaporators can be used to deposit metal films that can be patterned with photolithographic protocols. The deposited metal films can be then used as electrodes for the electrochemical deposition of gold-silver-platinum alloys ($Au_xAg_{1-x-y}Pt_y$), described schematically in FIG. 6. In the illustrated embodiment, patterned gold microelectrodes are printed on a fused silica substrate using a conventional sequence of metal evaporation, photolithographic patterning, and ion milling. (v-vii) The electrode pattern serves as a mask for a thick layer of negative photoresist, that in turn serves as a spacer and mold for the pulsed electroplating of a $Au_xAg_{1-x-y}Pt_y$ alloy. (viii-ix) The metal film is annealed in an inert gas furnace, which also removes the cured photoresist. Finally, the alloy film is converted into mesoporous electrodes by immersion in a nitric acid bath.

The electrodes of some embodiments may be tailored with specific small-pore gold alloys. Because of the differences in electrodeposition potentials between these three metals, the composition of films grown at low current densities will not reflect the composition of the electroplating solution. However, films deposited using high-current pulses have compositions that faithfully reproduce that of the solvent, have uniform thicknesses, and avoiding the pitting caused by $H_2$ gas bubbles that grow from and stick to the electrode surface when electroplating is carried out using large and constant current densities. Nevertheless, polycrystalline films grown by pulsed electrodeposition are composed of small grains that must be annealed in a furnace blanketed with inert gas to avoid cracks and inhomogeneous alloy compositions.

While the dealloying of $Au_xAg_{1-x-y}Pt_y$ ternary mixtures is not as extensively documented as that of $Au_xAg_{1-x}$ alloys, it has been shown that incorporating as little as 1 mol % Pt into the alloy makes it possible to produce electrodes with much finer pores than without. Furthermore, the homogeneous, face-centered cubic (FCC) solid-solution of the $Au_xAg_{1-x}$ equilibrium alloy is not affected by the Pt dopant: the surface of the dealloyed metal does seem to be Pt-enriched, but the equilibrium phase is still a homogeneous, FCC solid-solution provided that y/x.0.1: regardless of the residual Ag content. In addition to refining the pore structure of the dealloyed material, the low surface mobility of the Pt atoms dramatically slows the inevitable coarsening of the pore structure, providing a stable surface area and capacitance without compromising the inertness of the metal surface.

In an alternative fabrication method, rather than a dealloying technique porous platinum or platinum-iridium alloy electrodes are directly plated using microphase separated templates—such as bicontinuous microemulsions or hydrolyzable diblock-copolymers. It is believed that this approach may obviate the need for high temperature annealing, and thus extend the compatibility of this approach to soft substrates, but is unlikely to produce nanoporous structures directly.

In yet another embodiment, the electrodes of the deionizer may be fabricated using laser-scanning galvanometers or belt- or motor-driven laser engravers to direct-write microelectrode patterns over large areas.

Currently, the state-of-the-art for dealloyed metal pore sizes and pore volumes is limited to pores several nm wide and pore volume fractions of ~50%. Assuming that the capacitance is approximately proportional to the available surface area, reducing the size of these features allows for construction of devices with thinner electrodes, and use them to actuate colloidal dispersions composed of smaller particles. Further, in one embodiment a conventionally dealloyed metal electrodes is encased in membranes with smaller (than the dealloyed metal) pores to manipulate nanoscopic particles. However, such an embodiment would inevitably reduce the permeability of ions and hamper their efficiency.

In one embodiment, rather than using bicontinuous microemulsions as a template for electroplated porous metals, the electrodes are comprised of vertically aligned carbon nanotubes. For example, created by plasma-enhanced chemical-vapor-deposition (PECVD).

In another embodiment, the electrodes are comprised of carbon nanotube mats produced by electrodeposition. Dispersions of multi-walled nanotubes with narrow inner and outer diameters are now easily available and less expensive than the noble metal alloys used for dealloying, and their specific surface area is not subject to Ostwald ripening.

Thus, systems and methods in accordance with the above provide for exquisite control of colloidal systems. For example, by controlling the voltage applied through one or more electrodes, spatial selectivity and nano- and microparticle assembly can be controlled.

In a further embodiment, the porous deionizer is combined with a temperature modulator to control the self-assembly of binary colloids and that of particles assembled using multivalent ions. Typically, the interaction between oppositely charged particles or between polyelectrolytes and multivalent ions is very strong. However, these strong interactions can be used to produce inter-particle forces that need to be very small (in a relative sense). This is possible because of the over salt concentration to push us very close to a critical point where the entropy of the polymers precisely balances the entropy of the ions. However, the precise location of this point depends on the temperature of the solution. Consequently, a device using a porous deionizer described above can be used to approach that critical point and then the temperature modulator can be used to fine-tune the equilibrium to get to the critical point. Such a device combining a porous deionizer with a thermal modulator may also be used with techniques that include thermal annealing.

Deionizers or constructs utilizing same would allow for control of optical/photonic properties while providing for more feasible manufacturing and scaling than current systems, such as CCAs. Broadband photonic colloidal structures can be replicated and scaled as described herein.

In one embodiment, the deionization could be combined with temperature modulation to control the self-assembly of the binary colloids and that of particles assembled using multivalent ions. Typically, the interaction between oppositely charged particles or between polyelectrolytes and multivalent ions is very strong. Despite this, such normally strong interactions can be used to produce inter-particle forces that need to be very small (in a relative sense) by exerting fine control over salt concentration to push very close to a critical point where the entropy of the polymers precisely balances the entropy of the ions. However, the precise location of this point depends on the temperature of the solution. Consequently, the above described deionizers can be used as a type of "gross" control to get close to a desired structure and then a "fine" temperature control can be used to achieve the exact desired structure.

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

As used herein, the terms "about" and "approximately" generally mean plus or minus 10% of the stated value. For example, about 0.5 would include 0.45 and 0.55, about 10 would include 9 to 11, about 1000 would include 900 to 1100.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A method of forming colloidal crystal arrays comprising:
   immersing a first electrode and a second electrode in a colloidal suspension comprising a plurality colloidal particles in a solvent and having a plurality of ions, the first electrode having a first plurality of pores and the second electrode having a second pluralities of pores wherein the first plurality of pores and the second plurality of pores are smaller than the plurality of colloidal particles in the colloidal suspension;
   passing a current through the colloidal suspension from the first electrode to the second electrode;
   removing a portion of ions from the colloidal suspension;
   isolating the removed ions in the first electrode or the second electrode; and
   altering a range of attraction/repulsion between individual particles of the plurality of colloidal particles.

2. The method of claim 1, wherein the first electrode includes a first electrode electrolyte and the second electrode includes a second electrode electrolyte and wherein the first plurality of pores have a first pore size that is larger than a first molecule size of molecules of the first electrolyte and the second plurality of pores have a second pore size that is larger than a second molecule size of molecules of the second electrolyte.

3. The method of claim 1, wherein the first electrode comprises a first semipermeable membrane separating the colloidal particles of the colloidal suspension from the first electrode and wherein the second electrode comprises a second semipermeable membrane separating the colloidal particles of the colloidal suspension from the second electrode.

4. The method of claim 1, further comprising adding a salt to the colloidal suspension, prior to the salt being dissolved by the solvent.

5. The method of claim 4, wherein the solvent does not dissociate upon passing the current.

6. The method of claim 1, further comprising forming a crystal comprising the colloidal particles.

7. The method of claim 6, further comprising providing a template for crystal growth and wherein forming the crystal comprises forming the crystal on the template and further wherein the crystal has a lattice structure based upon the template.

8. The method of claim 1, further comprising altering a temperature to tune entropy of the colloidal particles with entropy of the ions.

* * * * *